Figure 1:
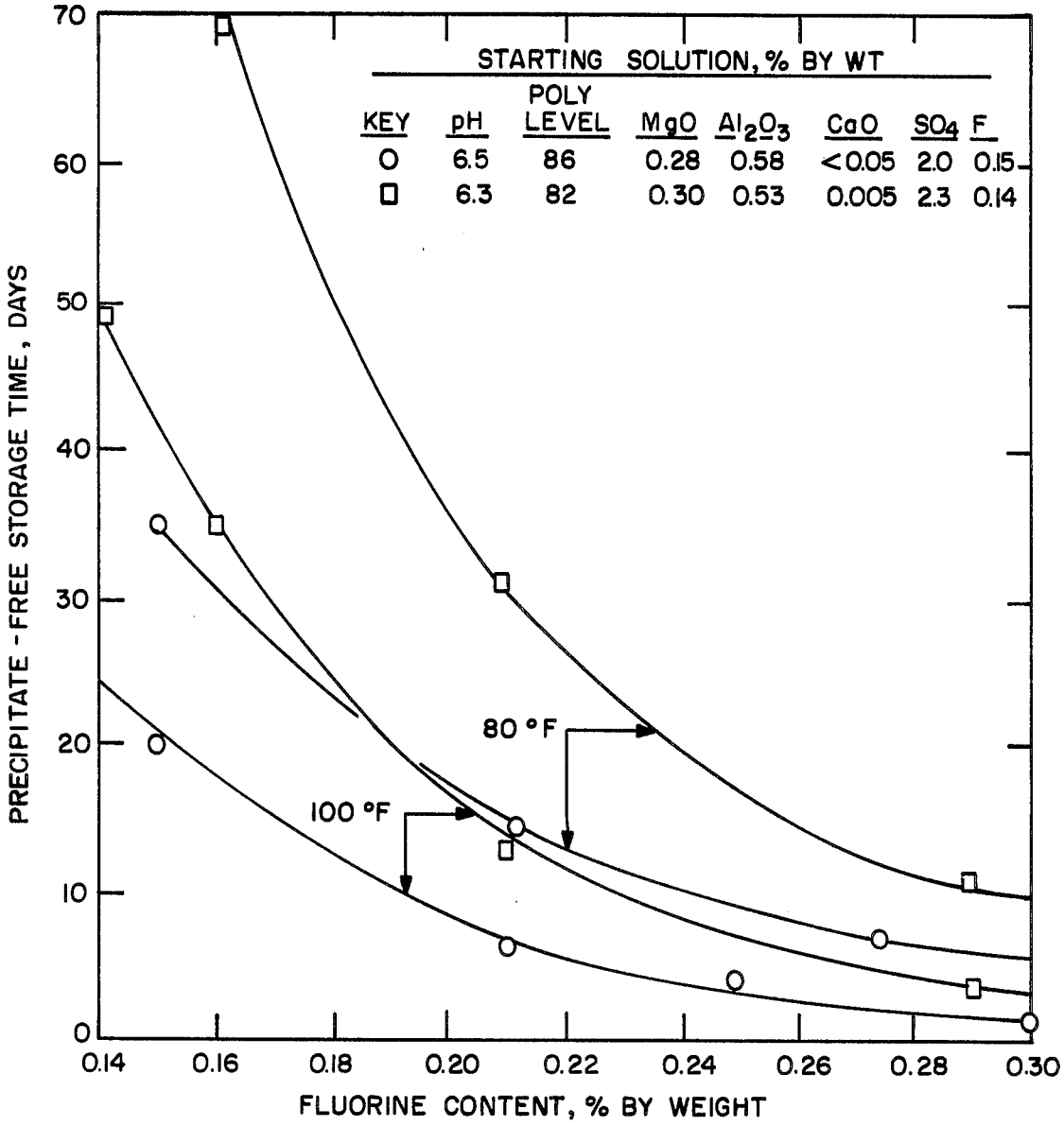
Figure 2:
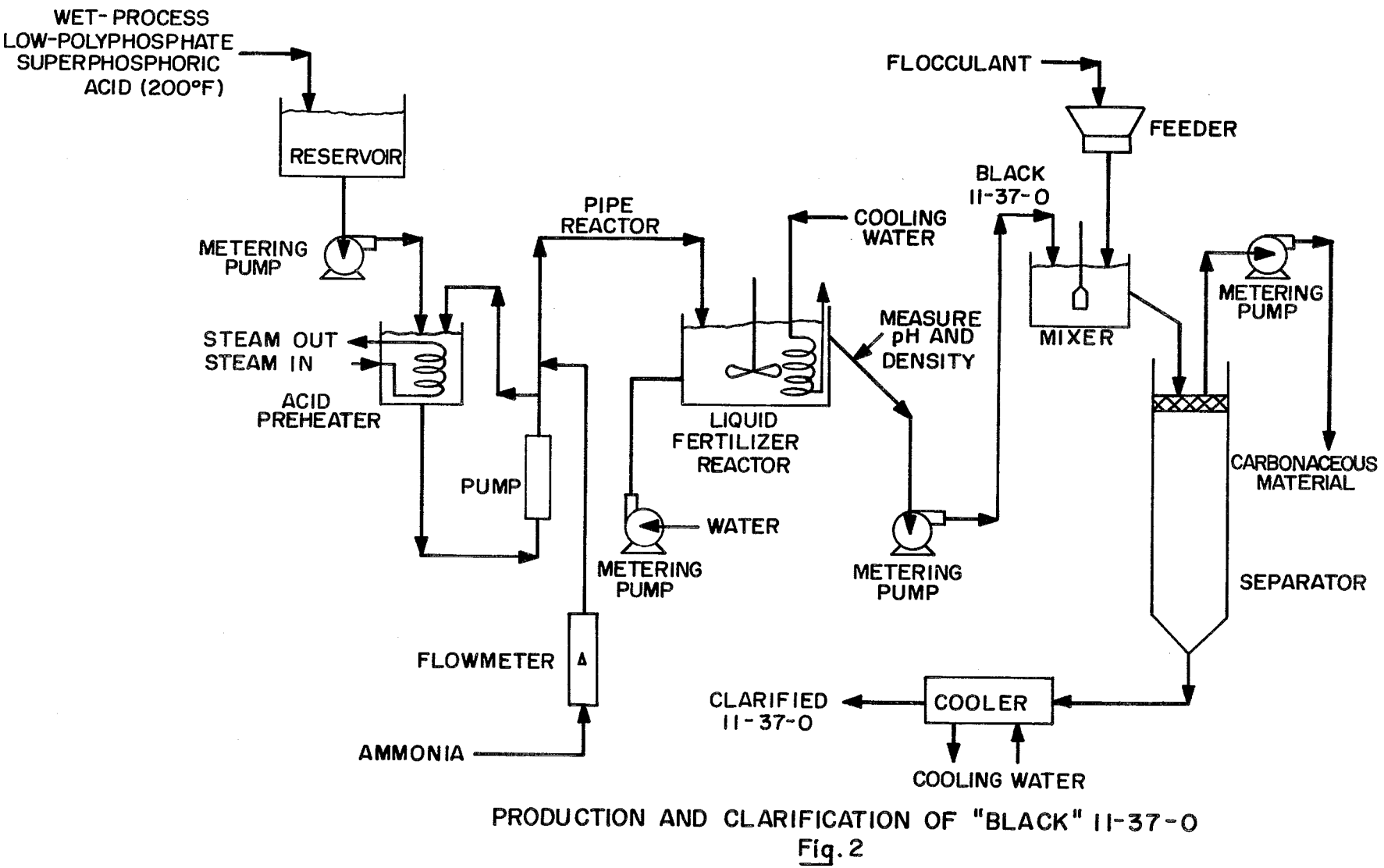
Figure 3:
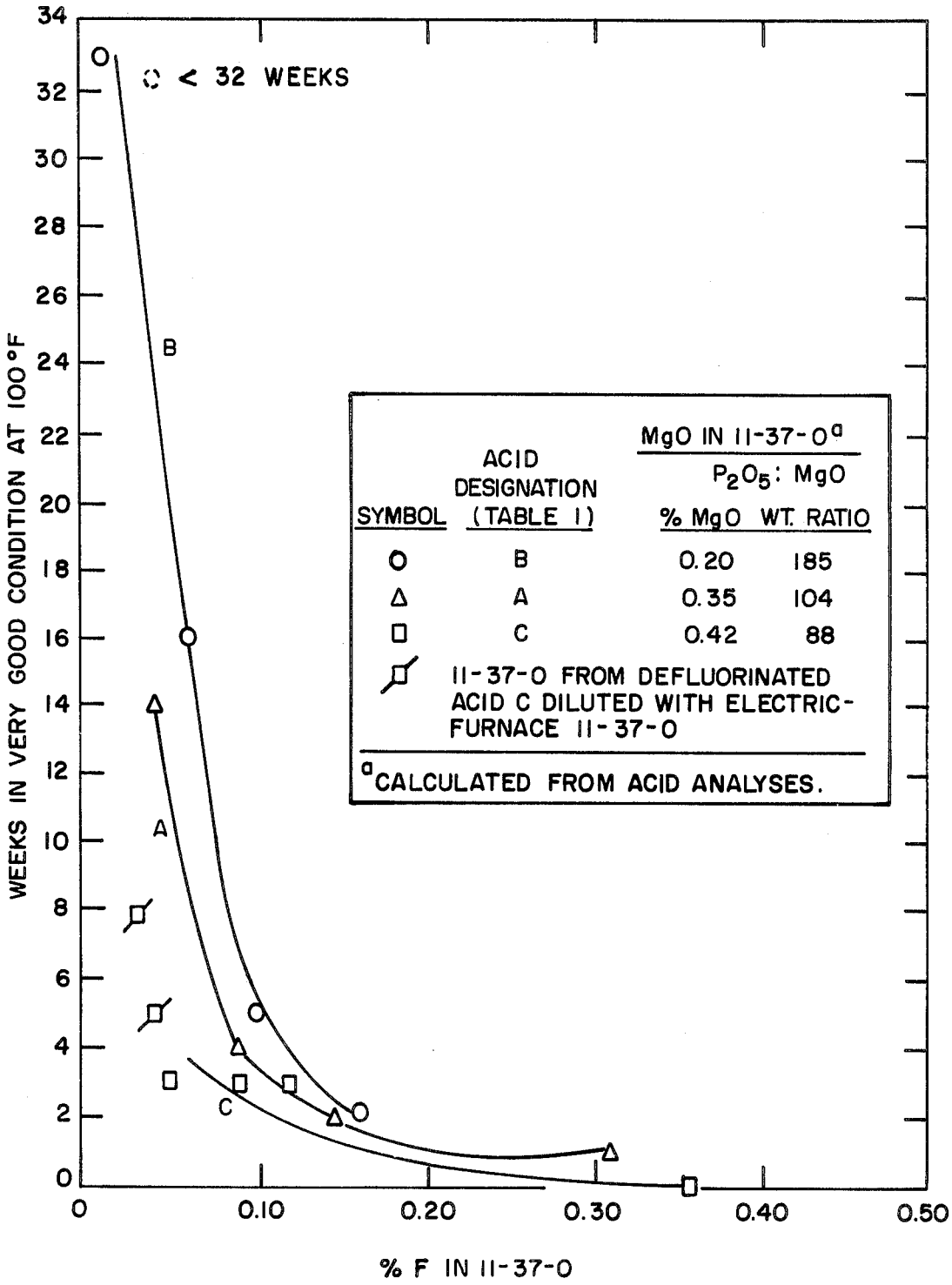

United States Defensive Publication [19] (H) [11] T982,001

Nix [43] May 1, 1979

[54] PREPARATION OF LIQUID FERTILIZERS WITH IMPROVED STORAGE PROPERTIES

[75] Inventor: Fred D. Nix, Phil Campbell, Ala.

[73] Assignee: Tennessee Valley Authority

[21] Appl. No.: 778,285

[22] Filed: Mar. 16, 1977

[51] Int. Cl.[2] ..... C05B 15/00; C05C 9/00

[52] U.S. Cl. ..... 71/29; 71/34; 71/64 C; 71/DIG. 3

[57] ABSTRACT

A method for improving the storage properties of liquid fertilizers made from wet-process phosphoric acid. The wet-process acid is essentially defluorinated so that when it is processed by ammoniation to make high-analysis ammonium polyphosphate liquid fertilizers, the sometimes almost immediate precipitation of undesirable sludge compounds of magnesium does not occur in the liquid over long periods of storage. The liquids may be produced by dissolving hot ammonium polyphosphate melts directly as it is produced or by dissolving dry granular solid ammonium polyphosphate made from this type acid.

Both ammonium polyphosphate and urea-ammonium polyphosphate base solutions made from defluorinated wet-process acid are highly stable and they exhibit increased tolerance for higher magnesium and lower polyphosphate levels.

6 Claims, 3 Sheets Drawing,

25 Pages Specification

The file of this unexamined application may be inspected and copies thereof may be purchased (849 O.G. 1221, Apr. 9, 1968).

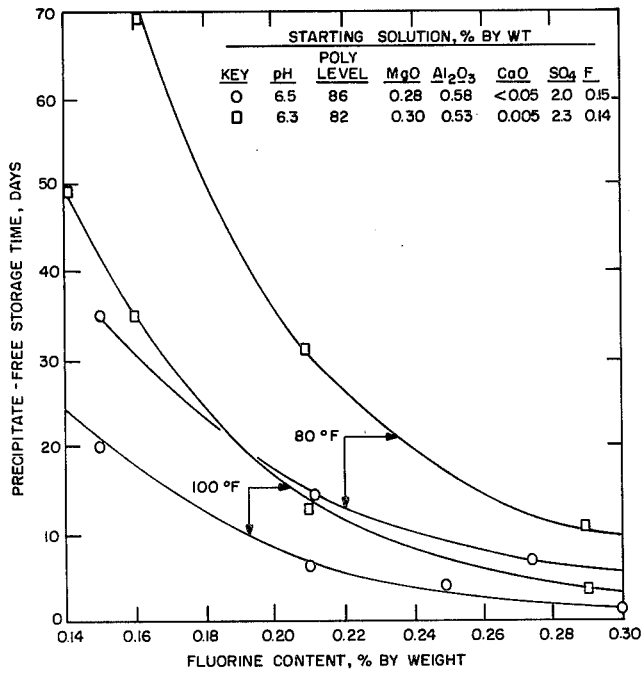

EFFECT OF FLUORINE CONTENT OF PIPE REACTOR 11-37-0 ON PRECIPITATE-FREE STORAGE TIME

EFFECT OF FLUORINE CONTENT OF PIPE REACTOR 11-37-0 ON PRECIPITATE-FREE STORAGE TIME

PRODUCTION AND CLARIFICATION OF "BLACK" 11-37-0

EFFECTS OF FLUORINE CONTENTS ON STORAGE LIFE OF CLARIFIED 11-37-0 LIQUID FERTILIZERS MADE FROM ACIDS OF SEVERAL MAGNESIUM CONTENTS.